(12) United States Patent
Strack

(10) Patent No.: US 6,739,165 B1
(45) Date of Patent: May 25, 2004

(54) COMBINED SURFACE AND WELLBORE ELECTROMAGNETIC MEASUREMENT SYSTEM AND METHOD FOR DETERMINING FORMATION FLUID PROPERTIES

(75) Inventor: Kurt M. Strack, Houston, TX (US)

(73) Assignee: KJT Enterprises, Inc., Houston, TX (US)

( * ) Notice: Subject to any disclaimer, the term of this patent is extended or adjusted under 35 U.S.C. 154(b) by 0 days.

(21) Appl. No.: 10/358,934

(22) Filed: Feb. 5, 2003

(51) Int. Cl.[7] .............................. G01V 1/28; G01V 3/18
(52) U.S. Cl. ........................................................ 72/13
(58) Field of Search ................................ 702/7, 12, 13; 324/323, 344, 350, 337, 357, 354, 348, 349, 345, 360, 353, 365

(56) References Cited

U.S. PATENT DOCUMENTS

| | | | |
|---|---|---|---|
| 5,321,613 A | * 6/1994 | Porter et al. ................... 702/1 |
| 5,597,042 A | 1/1997 | Tubel et al. | |
| 5,662,165 A | 9/1997 | Tubel et al. | |
| 5,764,515 A | 6/1998 | Guerillot et al. | |
| 5,767,680 A | 6/1998 | Torres-Verdin et al. | |
| 5,770,945 A | 6/1998 | Constable | |
| 5,886,255 A | 3/1999 | Aronstam | |
| 6,266,619 B1 | 7/2001 | Thomas et al. | |
| 6,438,069 B1 | 8/2002 | Ross et al. | |
| 6,462,549 B1 | * 10/2002 | Curtis et al. ................. 324/323 |
| 6,603,313 B1 | * 8/2003 | Srnka ......................... 324/354 |
| 2002/0043369 A1 | 4/2002 | Vinegar et al. | |

OTHER PUBLICATIONS

Strack and Vozoff, Integrating long–offset transient electromagnets (LOTEM) with seismics in an exploration environment, Geophysical Prospecting, 1996, 44, 997–1017.

* cited by examiner

Primary Examiner—Donald McElheny, Jr.
(74) Attorney, Agent, or Firm—Richard A. Fagin

(57) ABSTRACT

A method is disclosed for monitoring a reservoir. The method includes making a first set of electromagnetic measurements at locations along the Earth's surface, making a first measurement from at least one sensor disposed proximate the reservoir in a wellbore and determining an initial Earth model from the first electromagnetic and first sensor measurements. The initial Earth model include a fluid contact. At selected times, the sensor and electromagnetic measurements are repeated and a spatial distribution of the fluid contact is determined from the repeated measurements.

47 Claims, 4 Drawing Sheets

COMBINED SURFACE AND WELLBORE ELECTROMAGNETIC MEASUREMENT SYSTEM AND METHOD FOR DETERMINING FORMATION FLUID PROPERTIES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

1. Field of the Invention

The invention relates generally to the field of geophysical mapping of subsurface Earth structures. More specifically, the invention relates to systems and methods for mapping changes in content or composition of Earth formations over time.

2. Background Art

Geophysical mapping techniques for determining subsurface structures in the Earth include, for example, seismic surveying, magnetotelluric surveying and controlled source electromagnetic surveying, among others. In seismic surveying, an array of seismic sensors is deployed at the Earth's surface (or near the water surface or on the water bottom for various types of marine seismic surveying), and one or more seismic energy sources is actuated at or near the Earth's surface in a location near the seismic sensor array. A record is made, indexed with respect to time of actuation of the seismic energy source, of signals corresponding to seismic energy detected by each of the sensors in the array. Seismic energy travels downwardly from the source and is reflected from acoustic impedance boundaries below the Earth's surface. The reflected energy is detected By the sensors. Various techniques are known in the art for determining the structure of the subsurface Earth formations below and/or adjacent to the sensor array from recordings of the signals corresponding to the reflected seismic energy. Other techniques known in the art provide estimates of fluid content in porous Earth formations from characteristics of the reflected energy such as its phase and/or amplitude.

A particular technique for seismic mapping includes resurveying substantially the same subsurface area of the Earth at selected times after the initial seismic survey is performed. One purpose of such repeated seismic surveying is to determine the extent to which fluids in the pore spaces of permeable Earth formations have moved. A particular application for mapping fluid movement is to determined changes in subsurface reservoir content as economically useful fluids, such as petroleum, are produced from such permeable formations. Such repeated seismic surveying is known in the art as four dimensional (4D) seismic surveying. Using 4D seismic, it is possible, for example, to determine where oil and/or gas have been withdrawn from a petroleum-bearing permeable formation ("reservoir") and have been replaced by water. Such determination of oil, gas and water movement is particularly useful in determining whether water may unexpectedly be produced from a particular wellbore that penetrates the reservoir. 4D seismic surveying may also be used to determine prospective locations and/or geologic targets for wellbores to be drilled through the Earth to produce oil and/or gas which account for the movement of oil and/or gas from their originally determined locations in a reservoir.

4D seismic has the advantage of being relatively easily performed, and may enable mapping of subsurface fluid movement without the need to penetrate reservoirs in a large number of spaced apart locations.

Determining movement of fluids within Earth formations using 4D seismic techniques, however, requires that the fluids to be monitored cause the formations in which they are disposed to undergo a detectable change in seismic properties as the fluid content changes over time. In some cases, such as where oil and water in a reservoir have similar acoustic properties, it may be difficult to monitor oil and water movement in a reservoir using 4D seismic.

Another subsurface structure determination method known in the art is magnetotelluric (MT) surveying. MT surveying is described, for example in K. Vozoff, *The Magnetotelluric Method in the Exploration of Sedimentary Basins*, Geophysics 37, 98–141 (1972). Generally speaking, the MT method of subsurface structure mapping includes deploying an array of electric field and magnetic field sensors at the Earth's surface. Electromagnetic fields are induced in the Earth by ion currents moving in the Earth's ionosphere. The ionospheric currents induce substantially planar electromagnetic waves that radiate downwardly, and into the Earth. The array of sensors detects electric and magnetic fields induced by the plane wave in the Earth formations. The magnitude of the plane wave-induced electromagnetic fields at any position along the Earth's surface is related to the spatial distribution of electrically conductive materials in the Earth. MT methods of mapping have the advantages of using relatively inexpensive, easy to deploy sensors, and not needing a separate energy source to activate the Earth formations. MT techniques, however, require that the structures which are mapped be sufficiently electrically conductive to produce detectable electromagnetic field components at the Earth's surface. Petroleum-bearing formations, for example, are electrically resistive, as compared with the surrounding Earth formations. Mapping movement of petroleum (oil or gas) using MT techniques alone, therefore, has proven to be difficult.

Other systems and techniques for monitoring movement of fluid in Earth formations include permanently-emplaced sensors disposed in selected wellbores drilled through the Earth. Such sensors may include electrical resistivity sensors, natural radiation detection devices, acoustic sensors and other types of sensing devices known in the art for monitoring movement of fluids. See, for example, U.S. Pat. No. 5,886,255 issued to Aronstam. Using techniques such as disclosed in the Aronstam '255 patent can be expensive and, relatively speaking, somewhat unreliable because of the number of sensor systems which are used in such techniques. Other systems for reservoir monitoring and/or production control using permanently emplaced sensors are described, for example in U.S. Pat. No. 5,597,042 issued to Tubel et al., and U.S. Pat. No. 5,662,165 issued to Tubel et al. Geophysical systems for down hole measurements are disclosed by Vinegar et al. in published U.S. patent application Ser. No. 2002/0043369 A1 and include mostly temperature, pressure and acoustic sensors.

Other techniques for monitoring movement of petroleum in reservoirs include "well logging" at selected times using pulsed neutron (neutron capture cross section) instruments such as one sold under the trade name PDK-100 by Baker Hughes, Inc., Houston, Tex. Well logging includes lowering a measuring instrument into the wellbore at the end of a drill pipe, coiled tubing, or most commonly, at the end of an armored electrical cable. As the instrument is moved into or out of the wellbore, a record is made with respect to depth of the measurements made by the instrument. Such well logging techniques provide a determination within each wellbore surveyed of a depth of a hydrocarbon/water contact depth. Over time, as a reservoir produces oil and/or gas, the depth of the contact in each wellbore that penetrates the reservoir may change. By determining the depth in a number of wellbores at selected times, a change in the distribution of the contact over time may be determined. It is difficult and expensive to log individual wellbores, particularly when the wellbore is producing, because the petroleum production from the wellbore must be stopped ("shut in") during well logging operations Shutting in and logging a large number of wellbores to determine changes in the distribution of the contact can be difficult and expensive using well logging techniques known in the art. Further, some reservoirs may not have a sufficient number of wellbores that penetrate the reservoir in order to accurately map changes in distribution of the contact.

Methods to map the conductive parts of the formation are disclosed by Torres-Verdin et al. in U.S. Pat. No. 5,767,680 in which AC and DC electrical measurements are used to define the shape and location of oil water interfaces.

Other methods such as are disclosed in U.S. Pat. No. 6,266,619 B1 include data mining of the subsurface and matching to production history to optimize well control.

What is needed, therefore, is a system for mapping changes in fluid content of Earth formations which can be used where there is little acoustic impedance contrast between moved fluids, where the moved fluids are relatively electrically resistive, and which does not require permanently emplaced sensors in substantially every wellbore drilled through a reservoir.

SUMMARY OF INVENTION

One aspect of the invention is a method for monitoring a reservoir. The method includes making a first set of electromagnetic measurements at selected locations along the Earth's surface, and making a first measurement from at least one sensor disposed proximate the reservoir in a wellbore. An initial Earth model is determined from the first electromagnetic and first sensor measurements. The initial Earth model includes a fluid contact. At selected times, the sensor and electromagnetic measurements are repeated and a spatial distribution of the fluid contact is determined from the repeated measurements.

Another aspect of the invention is a system for mapping structures within the Earth. A system according to this aspect of the invention includes a plurality of electromagnetic sensors disposed in a selected pattern on the Earth's surface, at least one sensor disposed in a wellbore drilled proximate a subsurface structure to be mapped, and a means for mapping the subsurface structure from measurements made by the electromagnetic sensors and the at least one sensor. In some embodiments, the electromagnetic sensors include magnetotelluric sensors. In some embodiments, the electromagnetic sensors include controlled source electromagnetic induction sensors.

Another aspect of the invention is a method for monitoring a reservoir including making a first set of galvanic measurements at locations along the Earth's surface. A first set of measurements is made from at least one sensor disposed proximate the reservoir in a wellbore. An initial Earth model is determined from the first galvanic and first sensor measurements. The initial Earth model includes a spatial distribution of a fluid contact. The method according to this aspect includes repeating the sensor measurements and galvanic measurements at selected times and repeating determining the spatial distribution of the fluid contact from the repeated measurements. Some embodiments of a method according to this aspect of the invention include making electromagnetic measurements such as induction or magnetotelluric measurements. Determining the initial Earth model, and determining spatial distribution of the fluid contact takes account of the electromagnetic measurements.

Other aspects and advantages of the invention will be apparent from the following description and the appended claims.

DETAILED DESCRIPTION

Figure 1:
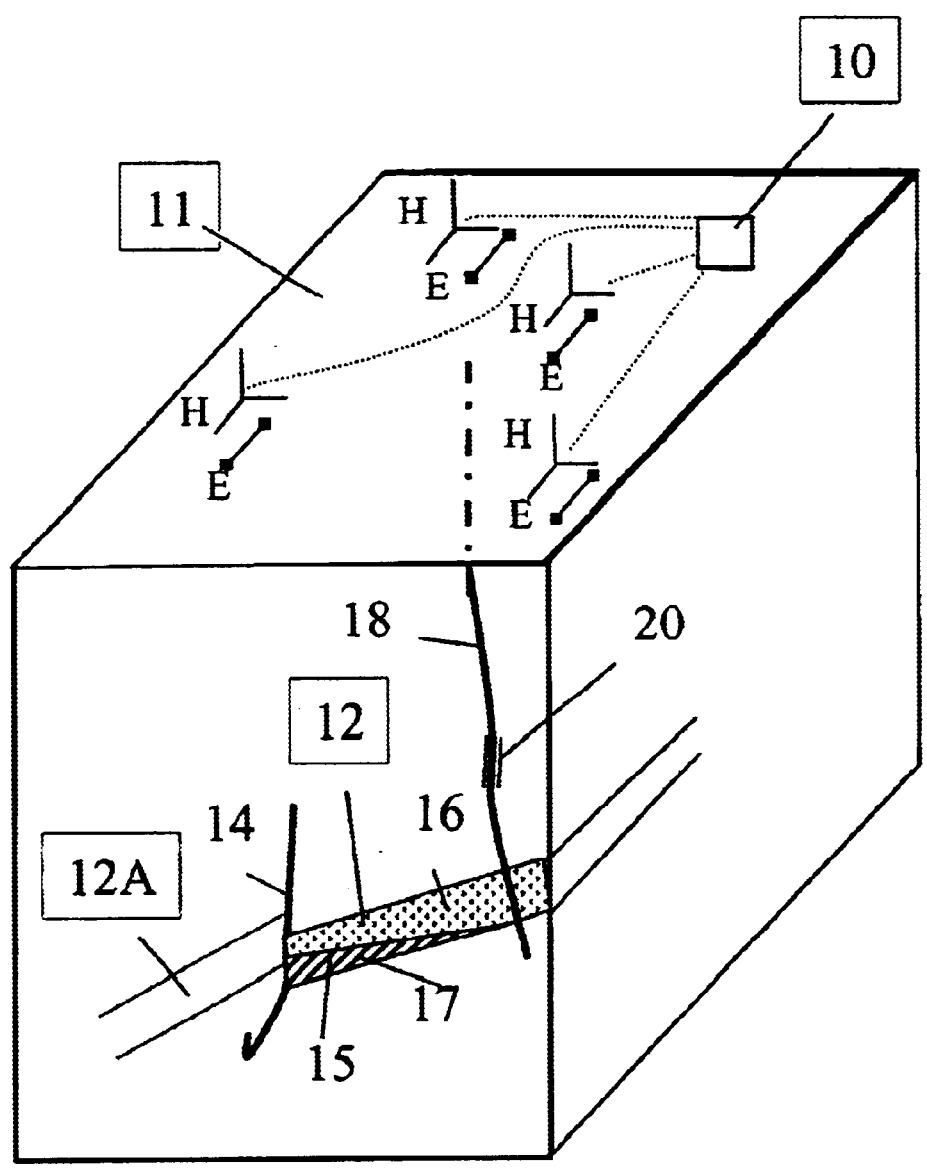
FIG. 1 shows schematically one example of a system according to the invention.

FIG. 1 schematically shows one example of a combined measurement system according to the invention. In this embodiment, a plurality of magnetotelluric (MT) sensors, each shown as a triaxial (three component) magnetic field sensor, generally at H, and an electric field component sensor, generally at E, is deployed in a selected arrangement or pattern on the surface 11 of the Earth. The sensors E and H preferably are deployed near the subsurface location of a petroleum producing reservoir 12 which is to be monitored. The sensors E, H may be permanently deployed near the surface or in the subsurface, but in some embodiments may be deployed only at the time MT measurements are to be made. Measurements made by the sensors E, H are conducted to a recording unit 10 for recording and/or processing by one or more methods according to the invention. The embodiment of the sensors E, H shown in FIG. 1 may be sensors typically used on dry land surface, or may be marine MT sensors of any type known in the art. An example of a sea floor MT sensor system is shown U.S. Pat. No. 5,770,945. The exact number of and arrangement of MT sensors will depend on such factors as the geographic extent of the reservoir 12 and the depth of the reservoir 12, among other factors. The number of and arrangement of MT sensors is therefore nota limitation on the scope of the invention.

The reservoir 12 may be any type of permeable Earth formation known in the art to produce, for example, petroleum from within pore spaces of the rock forming the reservoir 12. In this example, the reservoir may extend, at 12A, across a fault 14 or similar geologic discontinuity which forms a suitable structure or "trap" on one side of the fault 14. In this example, the reservoir 12 includes an oil bearing zone 16 disposed generally above a water bearing zone 17. As is known in the art, as oil is removed from the oil bearing zone 16, in many reservoirs connate water in the water bearing zone 17 moves into the pore spaces in the reservoir 12 vacated by the extracted oil.

The present embodiment of the system includes at least one monitor wellbore 18 that is drilled close to or through the reservoir 12. The monitor well 18 includes therein at least one sensor 20 the response of which is at least partially dependent on the overall fluid content of the reservoir 12. For example, an acoustic velocity (interval transit time) sensor, a seismic sensor (hydrophone or geophone) and an electrical resistivity sensor all have response at least partially dependent on the fluid content of the reservoir 12. Other types of sensors that are useful with the invention include neutron capture cross-section sensors and bulk density sensors. Each of the foregoing types of sensors is well known in the art, as well as operation thereof.

As oil is removed from the reservoir 12, a position of a fluid contact 15 may change, generally moving upwardly as the oil is removed. A characteristic of the reservoir 12 such as electrical resistivity or acoustic impedance, may change as the fluid contact 15 moves within the reservoir 12. In some embodiments, the monitor wellbore 18 may be one from which fluids are extracted from the reservoir 12. In other embodiments, the monitor wellbore 18 may be a separate wellbore from which no fluid extraction takes place. Measurements from the at least one sensor 20 in the monitor wellbore 18 in some embodiments may be recorded in a storage device (not shown separately) and/or may be conducted to the recording unit 10 for recording and interpretation.

The at least one sensor 20 may be deployed in the monitor wellbore 18 by any one of a number of methods known in the art. In some embodiments, the sensor 20 is permanently emplaced in the monitor wellbore 18, such as by attachment to a wellbore pipe or casing (not shown). In other embodiments, the sensor 20 may be conveyed into the monitor wellbore 18 on an armored electrical cable (known as "wireline logging"). In still other embodiments, the sensor 20 may be conveyed at the end of a drill pipe or coiled tubing (known as "pipe conveyed logging").

In some embodiments, there may be more than one monitor wellbore and associated sensor disposed therein. Using a plurality of monitor wells and associated sensors may provide increased coverage area for determining movement of fluids in a reservoir having a larger geographic extent. In other embodiments, more than one reservoir may be monitored within a particular geographic area. In some embodiments, one or more purposely drilled monitor wells may each have a permanently emplaced sensor, and other wellbores drilled through the reservoir 12 for the purpose of producing oil and/or gas may be used at selected times for the purpose of obtaining reservoir monitoring measurements by conveying a selected type of sensor such as by wireline or pipe conveyance.

In one embodiment of a method according to the invention, a first set of MT measurements is made and preferably recorded before oil and/or gas production is begun from the reservoir, or shortly after oil and/or gas production is started. A first set of measurements is also made from the at least one sensor 20 in the monitor wellbore 18 at or near the same time.

In the one embodiment, a first Earth model is generated. The first Earth model represents the subsurface geologic structure, including a first or initial position of the contact 15. The initial structure may be determined using surface seismic surveying in combination with any one or more well known subsurface mapping techniques, including using well logs from any one or more wellbores drilled through the reservoir and/or the sensor 20 measurements from the monitor wellbore 18. The first set of MT measurements and first set of sensor measurements thus correspond to an initial fluid condition in the reservoir 12. Alternatively, the first Earth model may be determined by inversion processing the MT measurements and the sensor 20 measurements such that a structure of the Earth, including the structure of and the position of the contract 15 known from, for example, well log measurements and/or surface seismic measurements, most closely matches a predicted set of MT measurements made from the Earth structure and a predicted set of measurements from the sensor 20.

As fluid is withdrawn from the reservoir 12, additional sets of MT measurements may be made and combined with subsequent measurements from the sensor 20 made at selected times. Changes in position of the contact 15 at locations away from the monitor wellbore 18 may be determined by inversion processing the MT measurements and sensor 20 measurement as is done for the initial measurement set (a measurement set including MT measurements and sensor measurements).

In some embodiments, it may prove useful to include measurements from other wellbores drilled through the reservoir 12, in order to improve the accuracy with which the contact 15 is mapped at locations distant from the monitor wellbore 18. Such wellbores may include, as previously explained, fluid producing wellbores and/or purposely drilled monitor wellbores. In such embodiments, measurements from sensor(s) in the one or more monitor wellbores are used in combination with measurements made at the Earth's surface to map or determine the geometric distribution of the contact 15 at selected times. As will be readily appreciated by those skilled in the art, the number of monitor wellbores, the number of permanently emplaced sensors and the number of and types of sensors can be selected to best suit the particular type of reservoir being monitored, Reservoir parameters which may affect the selection of types of and numbers of wellbore-placed sensors include permeability of the reservoir, conductivity contrast between the hydrocarbon bearing part of the reservoir and any connate water bearing part of the reservoir, and the geographic extent of the reservoir. For example, a reservoir extending over a very large geographic area may be more accurately monitored using a larger number of spaced apart monitor wells than a more geographically compact reservoir. Correspondingly, a reservoir formation having high vertical permeability may be more accurately monitored using more closely spaced monitor wellbores. Accordingly, the number of monitor wellbores, and whether such wellbores include permanently emplaced or removably conveyed sensors (such as by drill pipe or wireline conveyance) are not intended to limit the scope of the invention.

Figure 2:
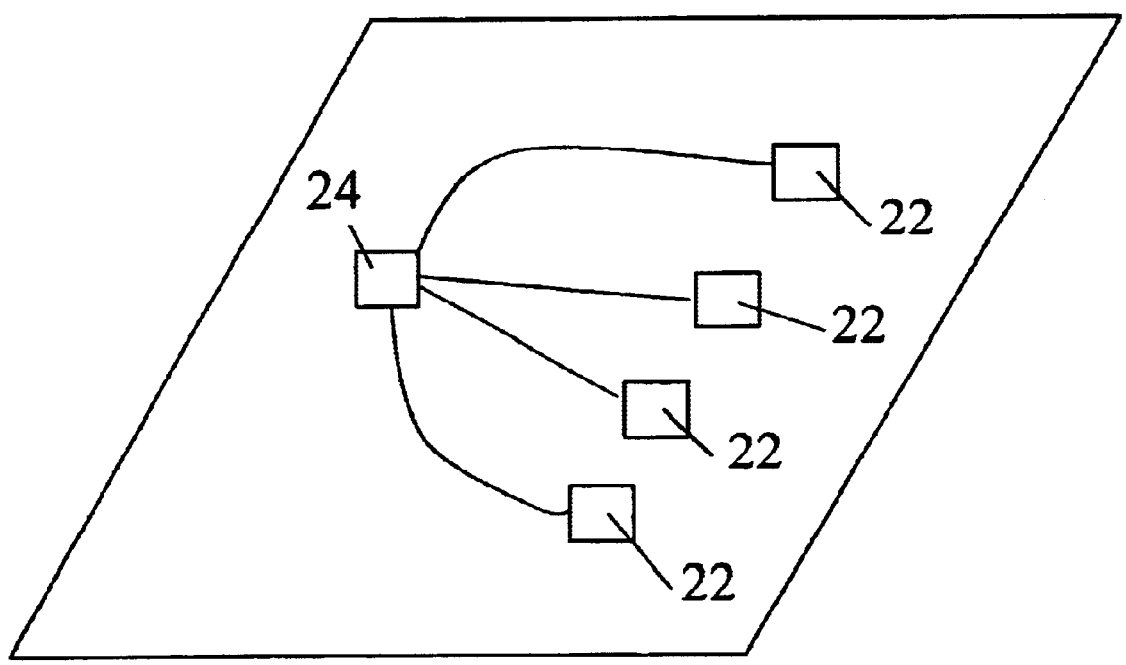
FIG. 2 shows another embodiment of a surface measurement system according to the invention.

MT measurements are only one embodiment of types of measurements made at the Earth's surface in accordance with the invention. Another embodiment of a system according to the invention is shown in FIG. 2 with respect to sensors at the Earth's surface. In the example embodiment of FIG. 2, a plurality of controlled source electromagnetic sensors, shown generally as wire loops 22 is disposed at selected positions on the Earth's surface in the vicinity of the reservoir (12 in FIG. 1). In this embodiment, the loops 22 are operatively connected to a recording system 24. The recording system 24 includes electrical circuits (not shown separately) of any type known in the art for passing a selected type of electrical current through the loops 22 and for receiving and interpreting voltages induced in the loops 22 by electromagnetic fields induced in the Earth. The electromagnetic fields are induced, as is known in the art, by the action of electrical current passing through one or more of the loops 22. The current passed through one or more of the loops 22 may be substantially continuous alternating current of one or more selected frequencies, such that an image of the subsurface may be made by frequency domain techniques known in the art. Alternatively, the current passed through one or more of the loops 22 may be short duration (transient) so as to enable imaging of the subsurface using techniques known in the art such as LOTEM (long offset transient electromagnetic) imaging. As in the previous embodiment, subsurface images of the Earth may be combined with data from the sensor (20 in FIG. 1) in the monitor well (18 in FIG. 1), to determine the geometric distribution of the contact (15 in FIG. 1) at selected times.

Figure 3:
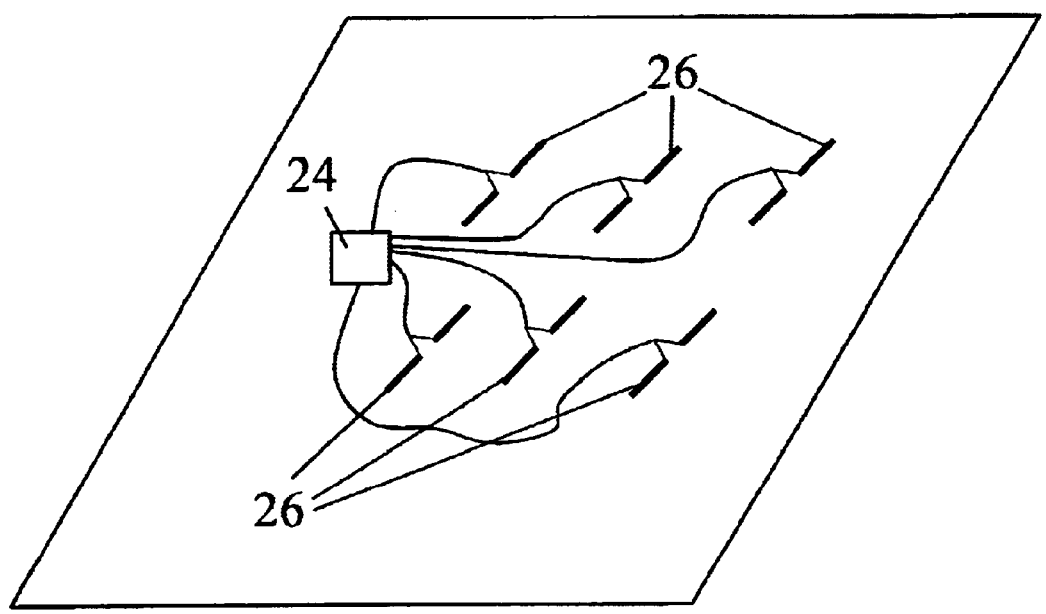
FIG. 3 shows another embodiment of a surface measurement system according to the invention.

Stil another embodiment of a system according to the invention is shown in FIG. 3. A plurality of controlled-source galvanic sensors, shown generally as electrode dipoles 26, are disposed at selected positions on the Earth's surface in the vicinity o fthe reservoir (12 in FIG. 1). In this embodiment, the electrodes 26 are operatively connected to a recording system 24. The recording system 24 includes electrical circuits (not shown separately) of any type known in the art for passing a selected type of electrical current through th eelectrodes 26 and for receiving at and interpreting voltages induced in the electrodes 26 by electric field induced in the Earth. The electric fields are induced, as is known in the art, by the action of electical current passing through one or more of the electrodes 26. The current passed through one or more of the electrodes 26 may be substantiallly continuous, such that an image of the subsurface may be made by frequency domain techniques known in the art. As in the privious embodiment, subsurcace inages of the Earth may be combined with data from the sensor (20 in FIG. 1) in the monitor well (18 in FIG. 1), to detrmine the geometric distribution of the contact (15 in FIG. 1) at selected times.

The embodiments described with respect to FIGS. 1, 2 and 3 may also be mixed in other embodiments. In such embodiments, the sensors deployed at or near the Earth's surface may be any suitable combination of magnetotelluric, controlled source electromagnetic or controlled source galvanic sensors. In embodiments in which galvanic and electromagnetic surfaced measurements are combined, the process of determining the initial Earth model ,and the spatial distribution of the fluid contact should take account of all the surface measurements actually used. Similarly, in such embodiments, repeating the determining the spatial distribution of the fluid contact should take account of all the surface measurements used at the time they are made.

Figure 4:
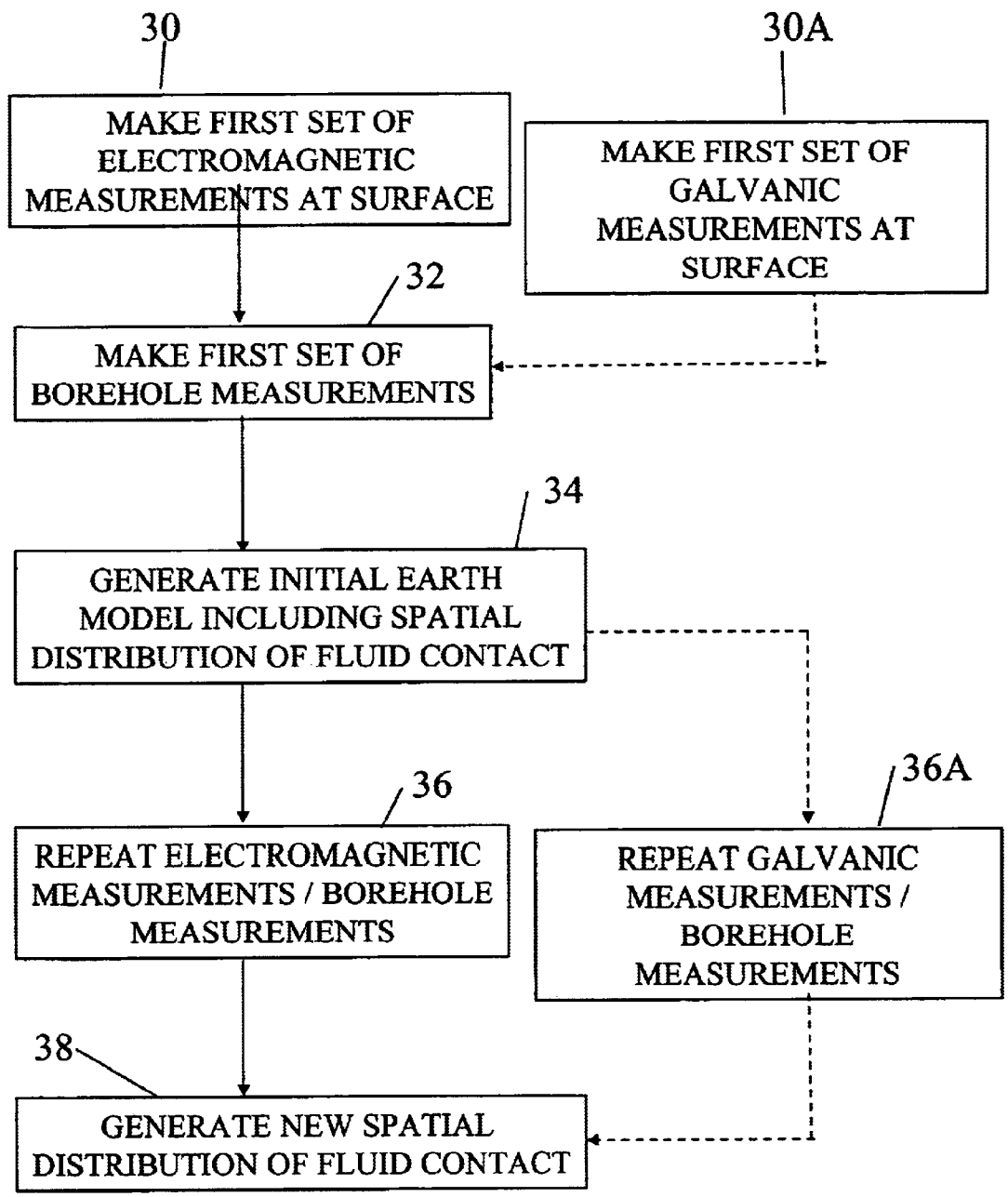
FIG. 4 shows a flow chart of an example embodiment of a method according to the invention.

Methods for monitoring changes in the spatial distribution of a fluid contact over time according to the various aspects of the invention will now be explained with reference to a flow chart in FIG. 4. At 30, a first set of electromagnetic measurements, such as magnetotelluric measurements or controlled source EM measurements, are made at the Earth's surface, along with a first set of measurements made from within one or more producing wellbores, or one or more monitor wellbores, as previously explained. Alternatively, or additionally, at 30A, a first set of galvanic measurements can be made. The borehole measurements, and the electromagnetic and/or galvanic measurements are then used, at 32, to generate an initial model of the Earth's subsurface structure. In some embodiments, inversion processing is used to generate the initial model. The initial model, as previously explained, includes the spatial distribution of a fluid contact (15 in FIG. 1). After a selected period of time, at 36, the electromagnetic measurements made at the Earth's surface and the borehole sensor measurements are repeated, and a new Earth model is generated, at 38. The new Earth model will include the new spatial distribution of the fluid contact (15 in FIG. 1). Additionally or alternatively, at 36A, galvanic measurements may be made at the Earth's surface, and used to generate the new Earth model including the new spatial distribution of the fluid contact (15 in FIG. 1).

While the invention has been described with respect to a limited number of embodiments those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for monitoring a reservoir, comprising:

making a first set of electromagnetic measurements at locations along the Earth's surface;

making a first measurement from at least one sensor disposed proximate e reservoir in a wellbore;

determining an initial Earth model from the first electromagnetic and first sensor measurements, the initial Earth model including spatial distribution of a fluid contact;

repeating the sensor measurements and electromagnetic measurements at selected times; and repeating determining the spatial distribution of the fluid contact from the repeated measurements.

2. The method as defined in claim 1 wherein the at least one sensor has a response at least partially affected by a fluid content of the reservoir.

3. The method as defined in claim 2 wherein the at least one sensor comprises a resistivity sensor.

4. The method as defined in claim 2 wherein the at least one sensor comprises a seismic sensor.

5. The method as defined in claim 2 wherein the at least one sensor comprises an acoustic velocity sensor.

6. The method as defined in claim 2 wherein the at least one sensor comprises a density sensor.

7. The method as defined in claim 2 wherein the at least one sensor comprises a neutron capture cross section sensor.

8. The method as defined in claim 1 wherein the determining the initial Earth model comprises inversion processing the first measurement from the at least one sensor and the first set of electromagnetic measurements.

9. The method as defined in claim 1 wherein the determining the spatial distribution of the fluid contact comprises inversion processing the measurements from the at least one sensor and the electromagnetic measurements.

10. The method as defined in claim 1 wherein the at least one sensor is permanently emplaced in a wellbore drilled proximate to the reservoir.

11. The method as defined in claim 1 wherein the at least one sensor is conveyed into a wellbore for making measurements using at least one of wireline, drill pipe and coiled tubing.

12. The method as defined in claim 1 wherein the electromagnetic measurements comprise magnetotelluric measurements.

13. The method as defined in claim 1 wherein the electromagnetic measurements comprise controlled source electromagnetic induction measurements.

14. The method as defined in claim 11 wherein the induction measurements comprise frequency domain measurements.

15. The method as defined in claim 11 wherein the induction measurements comprise transient electromagnetic measurements.

16. The method as defined in claim 1 further comprising making a first set of galvanic measurements at least one selected position along the Earth's surface, and wherein the initial earth model accounts for effects of the first set of galvanic measurements.

17. The method as defined in claim 16 further comprising repeating making galvanic measurements at selected times, and wherein the repeating determining the spatial distribution of the fluid contact accounts for the repeated galvanic measurements.

18. A method for monitoring a reservoir, comprising:
making a first set of galvanic measurements at locations along the Earth's surface;
making a first measurement from at least one sensor disposed proximate the reservoir in a wellbore;
determining an initial Earth model from the first galvanic and first sensor measurements, the initial Earth model including a spatial distribution of a fluid contact;
repeating the sensor measurements and galvanic measurements at selected times; and
repeating determining the spatial distribution of the fluid contact from the repeated measurements.

19. The method as defined in claim 19 wherein the at least one sensor has a response at least partially affected by a fluid content of the reservoir.

20. The method as defined in claim 20 wherein the at least one sensor comprises a resistivity sensor.

21. The method as defined in claim 20 wherein the at least one sensor comprises a seismic sensor.

22. The method as defined in claim 20 wherein the at least one sensor comprises an acoustic velocity sensor.

23. The method as defined in claim 20 wherein the at least one sensor comprises a density sensor.

24. The method as defined in claim 20 wherein the at least one sensor comprises a neutron capture cross section sensor.

25. The method as defined in claim 19 wherein the determining the initial Earth model comprises inversion processing the first measurement from the at least one sensor and the first set of galvanic measurements.

26. The method as defined in claim 19 wherein the determining the spatial distribution of the fluid contact comprises inversion processing the first measurement from the at least one sensor and the first set of galvanic measurements.

27. The method as defined in claim 19 wherein the at least one sensor is permanently emplaced in a wellbore drilled proximate to the reservoir.

28. The method as defined in claim 19 wherein the at least one sensor is conveyed into a wellbore for making measurements using at least one of wireline, drill pipe and coiled tubing.

29. The method as defined in claim 19 further comprising making a first set of electromagnetic measurements at least one position near the Earth's surface, and wherein the determining the initial Earth model accounts for the first set of electromagnetic measurements.

30. The method as defined in claim 29 wherein the electromagnetic measurements comprise magnetotelluric measurements.

31. The method as defined in claim 29 wherein the electromagnetic measurements comprise controlled source electromagnetic measurements.

32. The method as defined in claim 31 wherein the controlled source measurements comprise transient electromagnetic measurements.

33. The method as defined in claim 31 wherein the controlled source measurements comprise frequency domain measurements.

34. A system for mapping structures within the Earth, comprising:
a plurality of electromagnetic sensors disposed in a selected pattern on the Earth's surface;
at least one sensor disposed in a wellbore drilled proximate a subsurface structure to be mapped; and
means for mapping the subsurface structure from measurements made by the electromagnetic sensors and the at least one sensor, the means for mapping comprising means for determine a spatial distribution of a fluid contact within the Earth.

35. The system as defined in claim 34 wherein the means for mapping comprises means for inversion processing the measurements made by the electromagnetic sensors and the at least one sensor.

36. The system as defined in claim 34 wherein the at least one sensor has a response at least partially affected by a fluid content of the reservoir.

37. The system as defined in claim 36 wherein the at least one sensor comprises a resistivity sensor.

38. The system as defined in claim 36 wherein the at least one sensor comprises a seismic sensor.

39. The system as defined in claim 36 wherein the at least one sensor comprises an acoustic velocity sensor.

40. The system as defined in claim 36 wherein the at least one sensor comprises a density sensor.

41. The system as defined in claim 36 wherein the at least one sensor comprises a neutron capture cross section sensor.

42. The system as defined in claim 34 wherein the electromagnetic sensors comprise controlled source electromagnetic induction sensors.

43. The system as defined in claim 42 wherein the induction sensors comprise continuous wave sensors.

44. The system as defined in claim 42 wherein the induction sensors comprise transient electromagnetic sensors.

45. The system as defined in claim 34 wherein the electromagnetic sensors comprise galvanic sensors.

46. The system as defined in claim 34 wherein the electromagnetic sensors comprise magnetotelluric sensors.

47. The system as defined in claim 34 further comprising at least one galvanic sensor disposed proximate the surface of the Earth.

* * * * *

UNITED STATES PATENT AND TRADEMARK OFFICE
CERTIFICATE OF CORRECTION

PATENT NO. : 6,739,165 B1  
DATED : May 25, 2004  
INVENTOR(S) : Strack, Kurt M.

It is certified that error appears in the above-identified patent and that said Letters Patent is hereby corrected as shown below:

Column 9,
Line 24, should read as follows:
19. The method as defined in claim 18 wherein the at least one sensor has a response at least partially affected by a fluid content of the reservoir.
20. The method as defined in claim 19 wherein the at least one sensor comprises a resistivity sensor.
21. The method as defined in claim 19 wherein the at least one sensor comprises a seismic sensor.
22. The method as defined in claim 19 wherein the at least one sensor comprises an acoustic velocity sensor.
23. The method as defined in claim 19 wherein the at least one sensor comprises a density sensor.
24. The method as defined in claim 19 wherein the at least one sensor comprises a neutron capture cross section sensor.
25. The method as defined in claim 18 wherein the determining the initial Earth model comprises inversion processing the first measurement from the at least one sensor and the first set of galvanic measurements.
26. The method as defined in claim 18 wherein the determining the spatial distribution of the fluid contact comprises inversion processing the first measurement from the at least one sensor and the first set of galvanic measurements.
27. The method as defined in claim 18 wherein the at least one sensor is permanently emplaced in a wellbore drilled proximate to the reservoir.
28. The method as defined in claim 18 wherein the at least one sensor is conveyed into a wellbore for making measurements using at least one of wireline, drill pipe and coiled tubing.

UNITED STATES PATENT AND TRADEMARK OFFICE
CERTIFICATE OF CORRECTION

PATENT NO.   : 6,739,165 B1
DATED        : May 25, 2004
INVENTOR(S)  : Strack, Kurt M.

It is certified that error appears in the above-identified patent and that said Letters Patent is hereby corrected as shown below:

Column 9 (cont'd),
29. The method as defined in claim 18 further comprising making a first set of electromagnetic measurements at least one position near the Earth's surface, and wherein the determining the initial Earth model accounts for the first set of electromagnetic measurements.

Signed and Sealed this

Fourth Day of April, 2006

JON W. DUDAS
*Director of the United States Patent and Trademark Office*